No. 687,969. Patented Dec. 3, 1901.
G. H. ROBERTS, Sr.
NUT LOCK.
(Application filed Sept. 14, 1901.)
(No Model.)
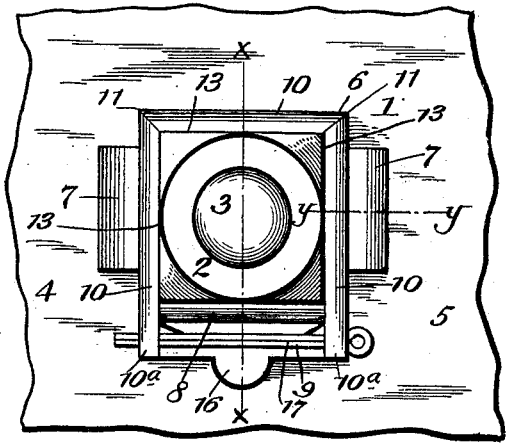
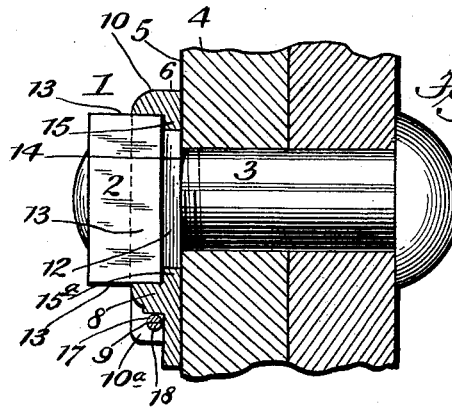
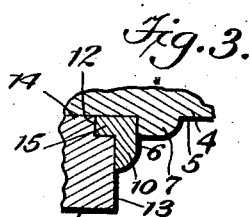
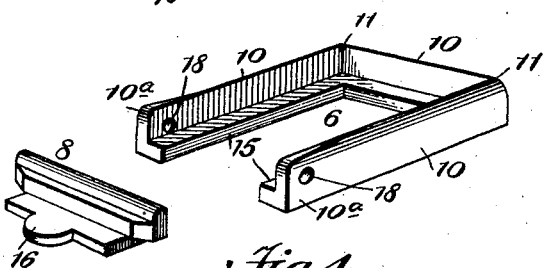
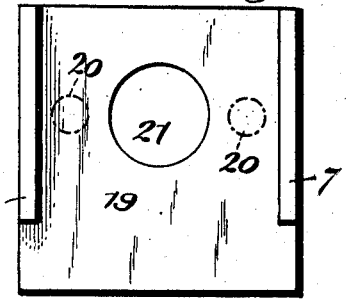
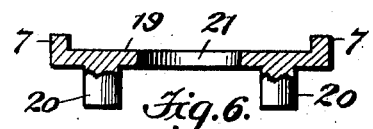
Witnesses:-
Inventor:
George H. Roberts, Sr.
By J. R. Littell
his Atty.

UNITED STATES PATENT OFFICE.

GEORGE H. ROBERTS, SR., OF NEW YORK, N. Y.

NUT-LOCK.

SPECIFICATION forming part of Letters Patent No. 687,969, dated December 3, 1901.

Application filed September 14, 1901. Serial No. 75,395. (No model.)

*To all whom it may concern:*

Be it known that I, GEORGE H. ROBERTS, Sr., a citizen of the United States, residing at New York, in the county and State of New York, have invented certain new and useful Improvements in Nut-Locks, of which the following is a specification.

This invention relates to nut-locks; and it has for its object to provide an improved device of this class which will operate to effectually lock the nut against unscrewing and which will maintain the bolt and nut in truly-centered arrangement in connection with the work, whereby wear and tear of the same will be obviated.

The invention has for its particular object the provision of an improved nut-lock which will be superior in point of simplicity and inexpensiveness of construction, in combination with durability and efficiency in use.

In the drawings, Figure 1 is a face view of my improved nut-lock, showing the same in use. Fig. 2 is a detail vertical sectional view taken upon the line $x$ $x$, Fig. 1. Fig. 3 is a detail sectional view taken upon the line $y$ $y$, Fig. 1. Fig. 4 is a detail perspective view of a locking-frame constituting one element of my improved nut-lock. Fig. 5 is a plan view of the top plate, constituting a modified form of construction. Fig. 6 is a transverse sectional view of the same.

Corresponding parts in all the figures are denoted by the same reference characters.

Referring to the drawings, 1 designates my improved nut-lock, which is employed in the customary manner in connection with the nut 2, the bolt 3, and the work 4, which latter in the present instance is provided with a flat outer face 5, against which the nut and the nut-lock bear in operative association.

The improved nut-lock embodies a locking-frame 6, which embraces the nut and coacts with stops 7 upon the work to prevent the lateral displacement of the nut and bolt and the unscrewing of the former. The locking-frame 6 is provided with a detachable member 8, which is associated with the remaining portion of the frame after the latter has been operatively positioned, and locking means 9 are provided for securing the locking-frame in operative assembled position.

In the preferred form of construction the locking-frame 6 consists, when considered independently of the detachable member 8, of a plurality of side members 10, the number of which is one less than the number of faces of the nut and which are formed to respectively engage closely with the faces of the nut. The side members 10 are rigidly secured together at their ends, as at 11, and extend relatively at the angles determined by the polygonal formation of the nut. Several of the side members 10 are suitably formed for engagement with the correspondingly-formed stop or stops 7 to prevent displacement of the locking-frame by movement in a direction parallel with the axis of the bolt or directly away from the nut. In the preferred form of construction this result is obtained by forming the nut with a continuous cut-out facial recess 12, extending entirely around the nut at the base of the same in the shoulder formed by the several faces 13 of the nut and the base 14 of the same. Into this recess 12 fit inwardly-projecting base-flanges 15, which are formed upon the side members 10. The detachable side member 8 fits between the free ends 10$^a$ of the terminal side members 10, and said detachable side member is provided with a similar inwardly-projecting base-flange 15$^a$, which is capable of slidable insertion between the free ends of the base-flanges of the terminal side members above referred to. The detachable side member 8 is also provided with an outwardly-projecting wing 16, which extends above the work 4 in position for convenient engagement for the manipulation of the detachable side member to insert the same or withdraw the same from operative position.

The locking means may consist of a spring key-pin 17, which is inserted through openings 18, formed in the free ends 10$^a$ of the terminal side members 10 after the detachable member 8 has been inserted in operative position and prevents the displacement of the latter.

The stops 7, of which two are employed, are arranged diametrically oppositely, with the bolt as a center, and are suitably connected with or formed upon the work 4, being suitably spaced to permit the introduction of the locking-frame between the same by a sliding movement, and are of sufficient longitudinal dimensions to firmly brace the locking-frame and nut against lateral displacement and pivotal movement. The stops 7, as illustrated in Figs. 5 and 6, may be embodied in a stop-plate 19, which is particularly adapted for use in connection with woodwork and is provided with depending plugs 20, adapted to enter and be secured in openings in the work. The stop-plate 19 is formed with an opening 21, through which the bolt is passed.

The operation and advantages of my improved nut-lock will be readily understood. After the nut has been firmly screwed home upon the bolt and two of the faces of the same have been brought into parallelism with the opposed or operative faces of the stops 7 the locking-frame 6 is passed into position around the nut and between the stops in a sliding movement, the base-flanges 15 being forced into the recess 12 in the nut at the base edge of the same. The several parts are properly proportioned to obtain a close fit of the locking-frame in connection with the nut and the stops 7. The separate side member 8 is then inserted between the free ends 10ª of the terminal side members 10, the base-flange 15ª of the same being forced into the recess 12, and the complete locking-frame then surrounds the nut upon all its faces. The key-pin 17 is finally connected with the free ends 10ª of the terminal side members 10 and binds the entire locking-frame in completely-assembled form around the nut and in operative position with respect to the stops 7.

By means of my improved nut-lock the nut is held firmly against unscrewing as well as lateral movement, the bolt being thus retained effectually in centered arrangement and increased in serviceability and life.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. An improved nut-lock, comprising, in combination with two spaced stops secured to the work, a locking-frame consisting of a plurality of permanently-connected side members and a detachable side member, and means for securing said side members around the nut and for locking said detachable side member in operative position.

2. An improved nut-lock, comprising, in combination with two spaced stops secured to the work, a locking-frame consisting of a plurality of permanently-connected side members and a detachable side member, and means for securing said side members around the nut and between said stops and for locking said detachable side member in operative position; each of said permanently-connected side members and said detachable side member being provided with an inwardly-projecting flange which flanges enter a continuous facial recess in the nut.

In testimony whereof I have signed my name in the presence of the subscribing witnesses.

GEORGE H. ROBERTS, SR.

Witnesses:
J. R. LITTELL,
HARTWELL P. HEATH.